(12) United States Patent
Kim

(10) Patent No.: US 6,922,300 B2
(45) Date of Patent: Jul. 26, 2005

(54) ACTUATOR LATCH DEVICE OF HARD DISK DRIVE

(75) Inventor: Do-wan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 528 days.

(21) Appl. No.: 10/072,979

(22) Filed: Feb. 12, 2002

(65) Prior Publication Data

US 2002/0114097 A1 Aug. 22, 2002

(30) Foreign Application Priority Data

Feb. 17, 2001 (KR) .......................................... 2001-7994

(51) Int. Cl.[7] .............................................. G11B 21/02
(52) U.S. Cl. ....................................................... 360/75
(58) Field of Search ................................ 360/75, 256.3, 360/256

(56) References Cited

U.S. PATENT DOCUMENTS

| | | | |
|---|---|---|---|
| 4,881,139 A | | 11/1989 | Hazebrouck |
| 5,162,959 A | * | 11/1992 | Arin et al. ................ 360/256.3 |
| 5,208,713 A | | 5/1993 | Lindsay et al. |
| 5,216,662 A | | 6/1993 | Stefansky et al. |
| 5,381,290 A | | 1/1995 | Cheng |
| 5,483,399 A | | 1/1996 | Jeong et al. |
| 5,583,724 A | | 12/1996 | Kim et al. |
| 5,612,842 A | | 3/1997 | Hickox et al. |
| 5,623,384 A | | 4/1997 | Hickox et al. |
| 5,668,683 A | * | 9/1997 | Stone ....................... 360/256.1 |
| 5,671,104 A | * | 9/1997 | Takahashi et al. ....... 360/256.3 |
| 5,694,271 A | * | 12/1997 | Stefansky ................ 360/256.3 |
| 5,812,345 A | | 9/1998 | MacPherson et al. |
| 6,088,193 A | | 7/2000 | Misso et al. |
| 6,134,077 A | * | 10/2000 | Misso et al. ................ 360/256 |
| 6,134,086 A | | 10/2000 | Kim |
| 2002/0176211 A1 | * | 11/2002 | Kim ........................ 360/256.3 |

FOREIGN PATENT DOCUMENTS

| | | | |
|---|---|---|---|
| EP | 1 037 201 A2 | | 9/2000 |
| JP | 9-22568 | | 1/1997 |
| JP | 2002298524 | * | 10/2002 ........... G11B/21/02 |
| KR | P1994-12314 | | 6/1994 |
| KR | 20-0172486 | | 12/1999 |
| WO | WO 96/10249 | | 4/1996 |

OTHER PUBLICATIONS

United Kingdom Patent Office's Combined Search and Examination Report Under Section 17 and 18(3) dated Feb. 15, 2002.

**WPI Abstract Acession No. 1997–142470[13].

* cited by examiner

Primary Examiner—David Hudspeth
Assistant Examiner—K. Wong
(74) Attorney, Agent, or Firm—Robert E. Bushnell, Esq.

(57) ABSTRACT

In an actuator latch device of a hard disk drive for locking an actuator to hold a magnetic head parked in a parking area, the actuator latch device includes a locking protrusion provided on an end portion of the actuator, a stopping guard having left and right side hooking portions for restricting a pivot range of the locking protrusion, a latch lever rotatably installed on the stopping guard for locking the actuator which rotates in one direction to have the magnetic head positioned in the parking area, and for preventing the actuator from moving back in the opposite direction, by moving one end of the latch lever to a position for interfering with the locking protrusion when the the head is parked, and a latch lever driving means for driving the latch lever between a locking position and an unlocking position. Thus, since locking and unlocking is performed by selectively restricting movement of the locking protrusion provided on the actuator, a locking state can be firmly maintained and unlocking is performed smoothly without any impact.

21 Claims, 6 Drawing Sheets

ACTUATOR LATCH DEVICE OF HARD DISK DRIVE

CLAIM OF PRIORITY

This application makes reference to, incorporates the same herein, and claims all benefits accruing under 35 U.S.C §119 from an application entitled Actuator Latch Apparatus For Hard Disk Drive earlier filed in the Korean Industrial Property Office on 17 Feb. 2001, and there duly at assigned Ser. No. 2001-7994 by that Office.

BACKGROUND OF THE INVENTION

1. Field of the Invention

The present invention relates to an actuator latch device of a hard disk drive for locking a magnetic head in a parking area in a magnetic head transfer mechanism of a hard disk drive.

2. Description of the Related Art

A latching mechanism or locking device is typically utilized to prevent undesired movement of the actuator and thus protect the disk from the effects of mechanical shock to the drive. For example, a known magnetic latching mechanism is described in U.S. Pat. No. 5,583,724 to Sung-Wook Kim et al. entitled Magnetic Latching Apparatus For An Actuator Of A Hard Disk Drive. A system using both mechanical and magnetic latching means is described in U.S. Pat. No. 6,088,193 to Nigel F. Misso entitled Pawl Latch For A Disc Drive.

A hard disk drive similar to the U.S. Pat. No. 5,583,724 patent is shown in FIG. 1, and includes a hard disk 20, rotatably installed on a base 10, where a predetermined information is recorded, and a magnetic head transfer mechanism for transferring a magnetic head 50 to a desired track on the hard disk 20 to record or reproduce information. Here, the hard disk is divided into a recording area 22 where information is recorded, and a parking area 21 provided inside the hard disk 20 where the magnetic head 50 safely lands when the rotation of the hard disk 20 stops.

The magnetic head transfer mechanism includes an actuator 30 installed to be capable of pivoting around a pivot shaft 34 provided on the base 10, where the magnetic head 50 is installed, a voice coil motor for pivoting the actuator 30 by means of an electromagnetic force, and a latch device for locking the actuator 30 after the magnetic head 50 safely lands on the parking area 21.

The actuator 30 includes a suspension portion 31 for supporting the magnetic head 50, a arm 32 coupled to the pivot shaft 34 to be capable of pivoting, and a bobbin portion 33 around which a mobile coil 35 of the voice coil motor is wound. The voice coil motor includes the mobile coil 35 wound around the bobbin portion 33, and a magnet 41 attached to a yoke 40 installed on the base 10 for generating a magnetic field. Although not shown in the drawing, a pair of yokes 40 are arranged to face each other from upper and lower sides with respect to the actuator 30. An electromagnetic force is generated by the interaction between the magnetic field generated by the magnet 41 and current flowing through the mobile coil 35. Thus, the actuator 30 pivots in a direction according to the Fleming's left hand rule.

Next, the latch device locks the actuator 30 to prevent movement after the magnetic head 50 safely lands on the parking area 21. The latch device includes a magnetic member 43 installed at the yoke 40 and magnetized by the magnet 41, a damper 60 inserted in a coupling protrusion 36 provided at one end of the bobbin portion 33 of the actuator 30, and an iron piece 61 coupled to one end portion of the damper 60. Thus, when the actuator 30 pivots and the magnetic head 50 installed at the suspension portion 31 moves in the parking area 21 of the hard disk 20, as shown in the drawing, the iron piece 61 coupled to the bobbin portion 33 adheres to the magnetic member 43. Thus, until an electromagnetic force is generated to pivot the actuator 30, the actuator 30 remains in a locked state in which the iron piece 61 and the magnetic member 43 are coupled together by the magnetic force.

The reasons for locking the actuator 30 are as follows. First, the suspension portion 31 for supporting the magnetic head 50 provides an elastic force in a direction in which the magnetic head 50 closely contacts a horizontal surface of the hard disk 20. Accordingly, unless an external force is applied, the magnetic head 50 maintains a state of being in close contact with the horizontal surface of the hard disk 20. However, as the hard disk 20 begins to rotate, flow of air around the magnetic head 50 is generated by the rotation of the hard disk 20. The flow of air generates lift to raise the magnetic head 50 from the horizontal surface of the hard disk 20. Thus, during recording or reproducing information on or from the recording area 22 of the hard disk 20 which is rotating, the magnetic head 50 is raised a predetermined flying height above the horizontal surface of the hard disk 20 in a non-contact state. As long as the magnetic head 50 remains above the surface of the disk 20 scratches are prevented.

However, when the rotation of the hard disk 20 is completely stopped, for example, when the power is turned off, the lift that has raised the magnetic head 50 gradually disappears as the rotation speed of the hard disk 20 decreases and the actuator 30 pivots so that the magnetic head 50 is placed in the parking area 21 before the magnetic head 50 descends and collides with the surface of the hard disk 20. Thus, as the rotation of the hard disk 20 stops and the lift disappears, the magnetic head 50 safely lands on the parking area 21 and the recording area 22 is not contacted by magnetic head 50.

If the magnetic head 50, placed in the parking area 21, was pushed toward the recording area 22 by an external impact, the magnetic head 50 in contact with the surface of hard disk 20 could then come into contact with the recording area 22. Accordingly, a defect such as a scratch can be generated in the recording area 22. Thus, to prevent the above defect, it is desired the actuator 30 be locked when the magnetic head is in the parking area 21 by adopting a latch device so that the actuator 30 does not pivot in response to an external impact.

However, since the actuator 30 is locked by an electromagnetic force applied between the iron piece 61 and the magnetic member 43, if an impact greater than the electromagnetic force is applied, the actuator 30 is unlocked and the magnetic head 50 in contact with the surface of hard disk 20 could then come into contact with the recording area 22.

Also, to pivot the actuator 30, being in a locking state, the electromagnetic force generated between the mobile coil 35 and the magnet 41, which exceeds the coupling force of the magnetic force between the iron piece 61 and the magnetic member 43, is applied to move the actuator 30 to unlock it. Thus, the force to magnetically engage the iron piece 61 and the magnetic member 43 is limited.

That is, when the force to magnetically engage the iron piece 61 and the magnetic member 43 is too small, the actuator 30 is easily unlocked by a small external impact. When the force to magnetically engage the iron piece 61 and the magnetic member 43 is too large, the actuator 30 is not easily unlocked even when the maximum electromagnetic force is generated to pivot the actuator 30. In such a structure, when the actuator 30 is unlocked by overcoming the magnetic engaging force between the iron piece 61 and the magnetic member 43, the actuator 30 springs back abruptly due to inertia and the coupling protrusion 36 may strongly collide with a stopper 42. The use of a stopper is described in the U.S. Pat. No. 6,088,193 patent. If the actuator 30 collides with the stopper 42, head slap may be generated due to the impact. To reduce the head slap, current needs to be applied to the mobile coil 35 to generate a braking force to the actuator 30 at the same time the actuator 30 is unlocked. However, it is difficult to configure a control system to timely applying the needed current to the mobile coil 35 to properly generate the braking force. Also, the damper 60 may be damaged since continuous stress is applied to the damper 60 due to repeated actions of locking and unlocking.

To reduce the above described head slapping, the above system could be modified to reposition the stopper as in U.S. Pat. No. 6,134,086 to Myung-Il Kim and entitled Actuator Crash Stopper For A Hard Disk Drive. However, there remains a problem in determining the proper amount of magnetic force between the iron piece 61 and magnet 43 which should be applied to prevent the actuator 30 from being unlocked by an externally applied force greater that the magnetic force between the iron piece 61 and magnet 43.

Actuator latch devices, incorporated by reference herein, having improved structure for maintaining a locking state of an actuator and for performing electromechanical locking and unlocking actions are described in U.S. Pat. No. 5,381,20 to Chunjer C. Cheng entitled Bi-Stable Mechanical Latch For Disk Drive Actuator; U.S. Pat. No. 5,671,104 to Kohji Takashi et al. entitled System And Method For Locking A Disk Actuator In Vertical And Horizontal Directions; U.S. Pat. No. 5,812,345 to Aaron S. MacPherson et al. entitled Monostable Active Latch For A Disk Drive Actuator; U.S. Pat. No. 5,623,384 to Thomas A. Hickox et al. entitled Landing Zone Inertial Latch; U.S. Pat. No. 5,612,842 to Thomas A. Hickox et al. entitled Landing Zone Inertial Latch; and U.S. Pat. No. 5,483,399 to Woo-Cheol Jeong et al entitled Self-Latching Restraint For An Actuator Of A Disk Drive.

SUMMARY OF THE INVENTION

To solve the above-described problems, it is an object of the present invention to provide an actuator latch device of a hard disk drive having improved structure which can firmly maintain a locking state of an actuator and simultaneously perform locking and unlocking actions smoothly.

To achieve the above object, there is provided an actuator latch device of a hard disk drive for locking an actuator to prevent its movement when a magnetic head installed at one end of the actuator is positioned in a parking area, the actuator latch device comprising a locking protrusion provided on a second end of the actuator, a stopping guard having a pair of oppositely disposed hooking portions for restricting a pivot range of the locking protrusion, a latch lever rotatably installed for locking the actuator, which rotates in one direction to have the magnetic head positioned in the parking area, to prevent its movement back in the opposite direction, the latching lever being rotated about a pivot point to move one end of the latch lever having an interference portion to trap the locking protrusion between the interference portion and one of the hooking portions, and a latch lever driving means formed on a second end of the latch lever for driving the latch lever between a latched or locked position and an unlatched or unlocked position.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 2:
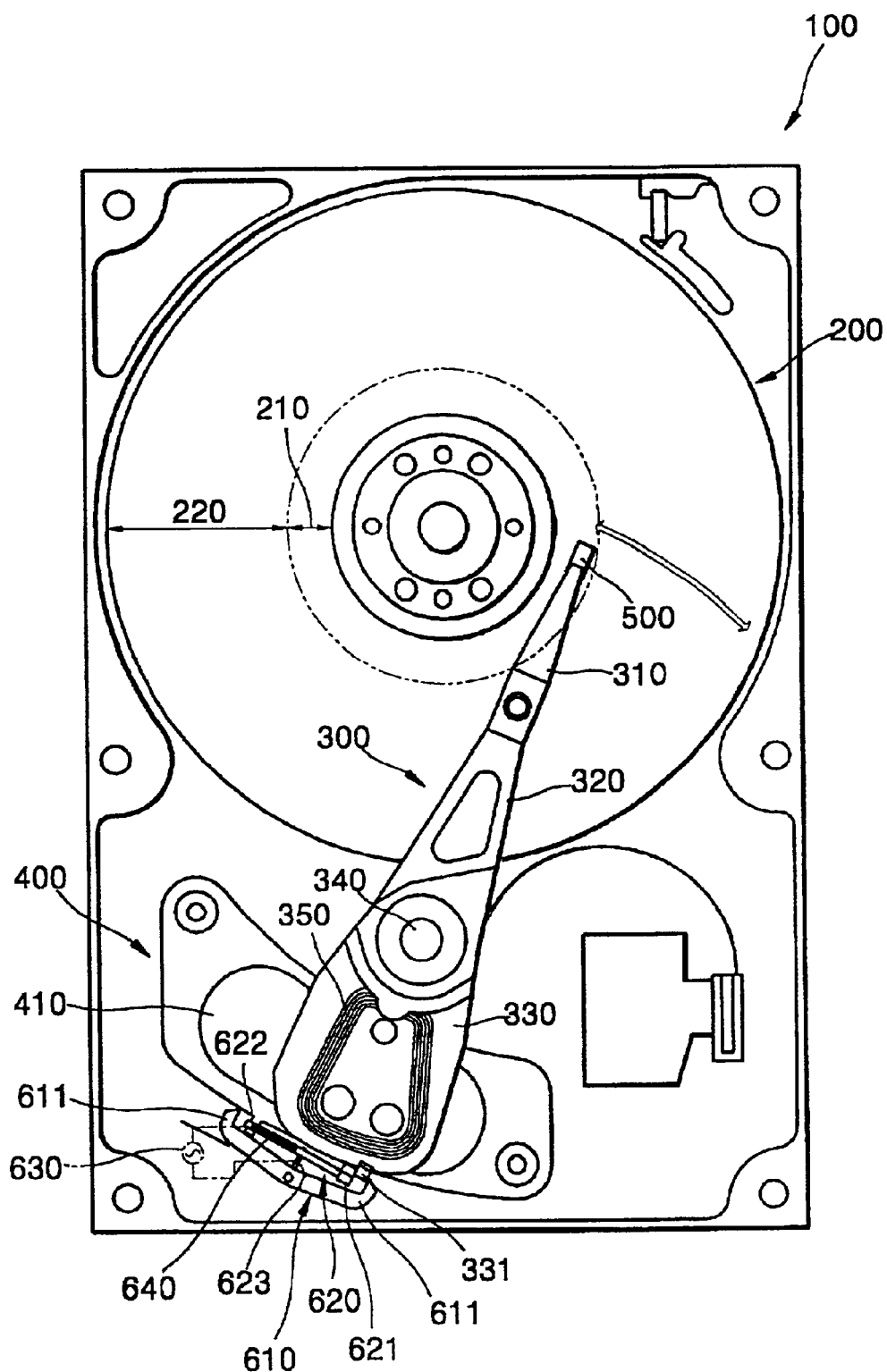
FIG. 2 is a plan view showing a hard disk drive adopting an actuator latch device, according to the present invention.
Figure 3:
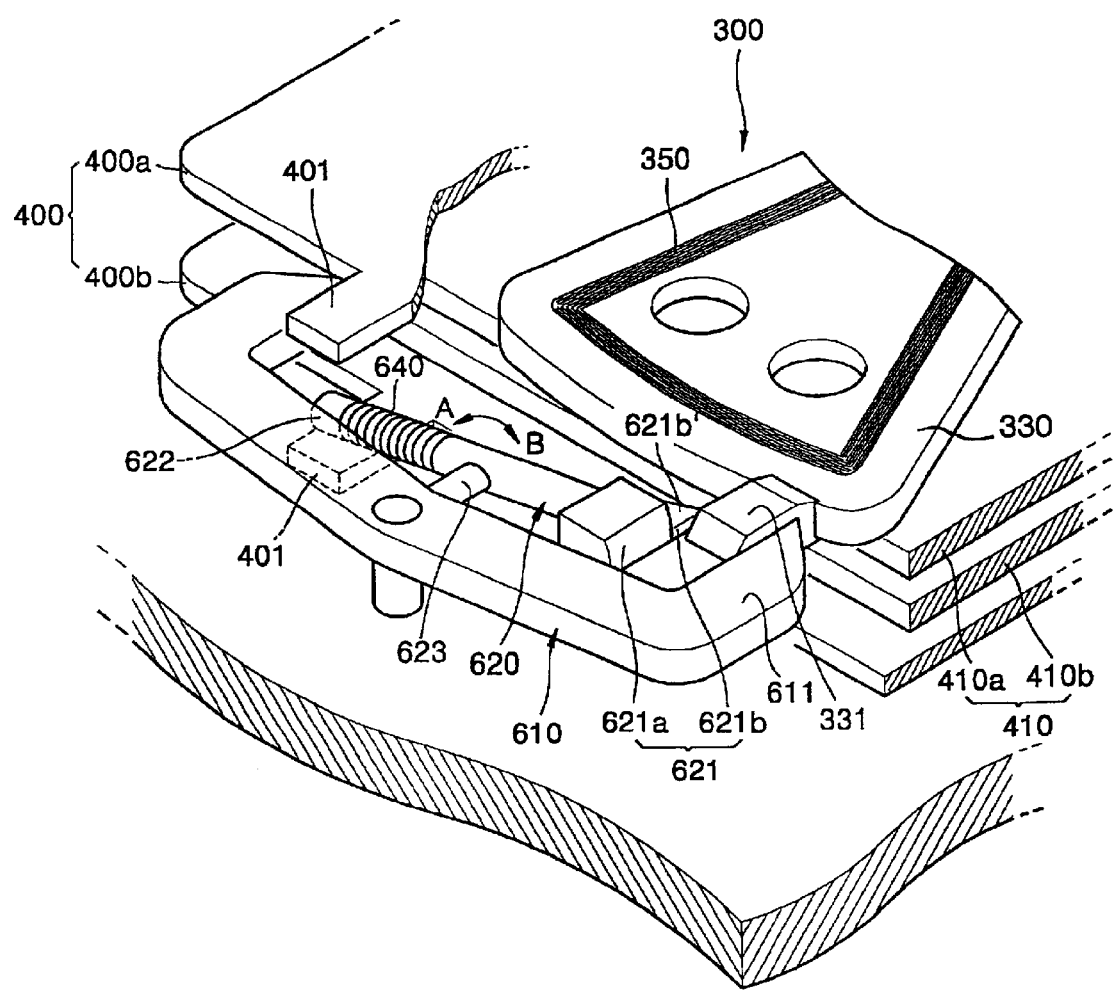
FIG. 3 is a perspective view showing the actuator latch device shown in FIG. 2, according to the present invention.

Referring to FIGS. 2 and 3, a magnetic head transfer mechanism includes an actuator 300 installed on a base 100 where a hard disk 200 is installed, to be capable of pivoting and having a magnetic head 500 installed at one side thereof, and a voice coil motor for pivoting the actuator 300 so that the magnetic head 500 can move across a parking area 210 and a recording/reproducing area 220 formed on the hard disk 200.

Here, the actuator 300 includes a suspension portion 310 for supporting the magnetic head 500, an arm 320 rotatably coupled to a pivot shaft 340 provided on the base 100, and a bobbin portion 330 around which a mobile coil 350 of the voice coil motor is wound.

The voice coil motor includes the mobile coil 350, and a magnet section 410 installed on a yoke section 400 installed on the base 100 for generating a magnetic field. The yoke section 400 and magnet section 410 comprise a pair of the yokes 400a and 400b and magnets 410a and 410b respectively arranged above and below the bobbin 330 of actuator 300, as shown in FIG. 3. Thus, magnetic fields in the vertical direction are formed by the upper and lower magnets 410a and 410b between the upper and lower yokes 400a and 400b.

A latching or locking mechanism, for locking the actuator 300 when the magnetic head 500 is disposed in the parking area 210 of the hard disk 200, includes a locking protrusion 331 rearwardly extending from the bobbin 330, a stopping guard 610 having a pair of oppositely disposed (left and right side) hooking portions 611 for limiting a scope of travel of the locking protrusion 331 thereby limiting the pivoting action of actuator 300 around pivot shaft 340, a latch lever 620 installed to be capable of rotating around a rotation shaft 623 provided on the stopping guard 610, an interference portion 621 and a coil 640 disposed on opposite ends of the latch lever 620, and a power supply portion 630 as a means for rotating the latch lever 620.

The power supply portion 630 supplies current to the coil 640 on one end 622 of latch lever 620 by selectively changing the direction of the current. Then, a magnetic field is formed at the one end 622 of latch lever 620 according to the direction of current and the one end 622 of the latch lever 620 becomes an N or S pole. The polarity of one end 622 interacts with the magnetic field formed between the upper and lower yokes 400a and 400b and acts as a driving force to rotate the latch lever 620. Each of the upper and lower yokes 400a and 400b include a corresponding coupling portion 401 rearwardly protrudes therefrom so that the one end 622 of the latch lever 620 magnetically adheres to the coupling portion 401 having an opposite polarity from the polarity of the one end 622.

The interference portion 621 provided on the other end portion of latch lever 620 locks the actuator 300 in the state in which the magnetic head 500 is disposed in the parking area 210 so that the locking protrusion 331 is confined to a space between the interference portion 621 and the right side hooking portion 611 of the stopping guard 610.

The interference portion 621 includes a first portion 621a attached to the latch lever 620 and a second portion 621b, in the form of an inclined step (see FIG. 4C) having an inclined surface 621b', protruding from the first portion 621a and toward the bobbin 330.

Figure 4A:
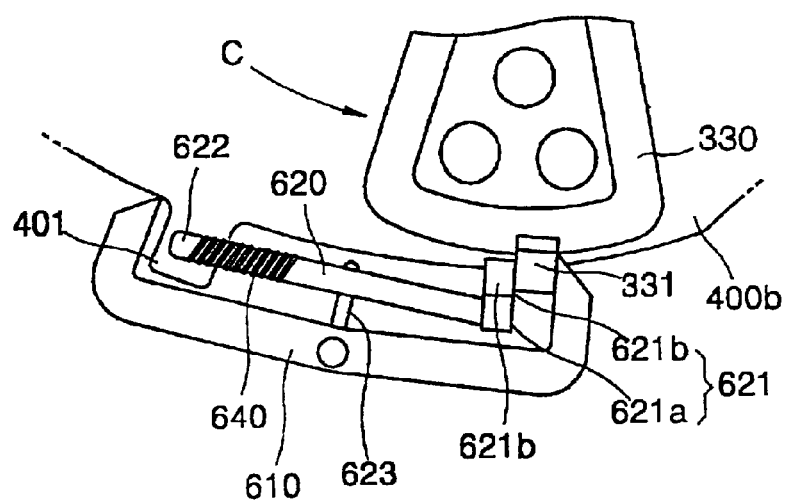
FIGS. 4A and 4C are views for explaining a locking step of the actuator latch device shown in FIG. 2, according to the present invention.
Figure 4B:
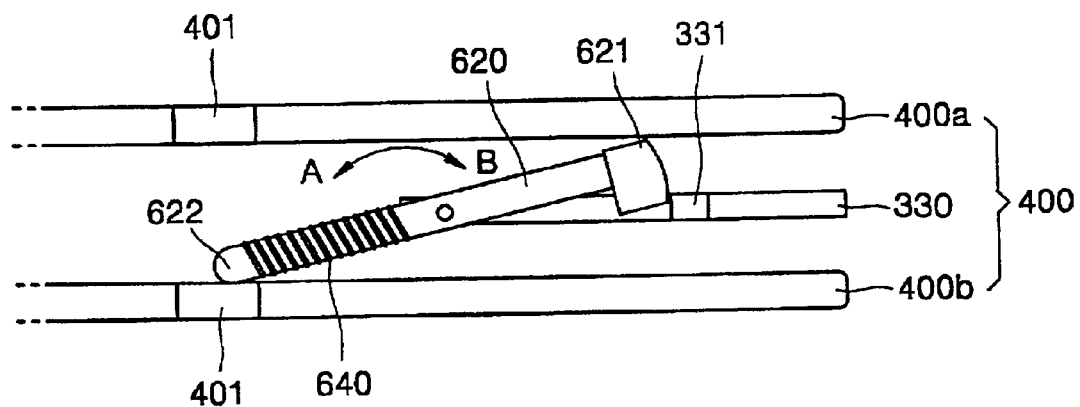
Figure 4C:
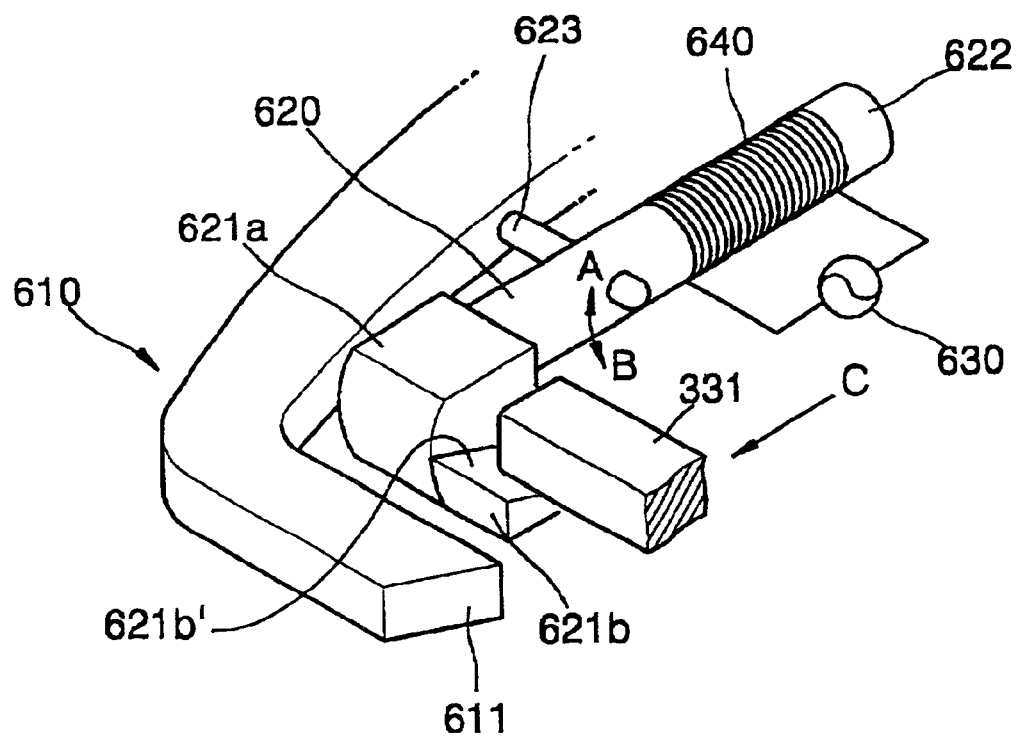

In the above structure, when the rotation of the hard disk 200 stops, for example, when the power is turned off, an electromagnetic force is generated by the interaction between the current flowing through the mobile coil 350 and the magnetic field generated by the magnet section 410. As shown in FIG. 4A, the actuator 300 pivots in a direction indicated by an arrow C so that the magnetic head 500 enters the parking area 210. Here, the power supply portion 630 supplies current to the coil 640 in one direction to form a polarity to the latch lever 620 so that the latch lever 620 is rotated in a direction indicated by an arrow A as shown in FIG. 4B by the interaction between the upper and lower yokes 400a and 400b. Accordingly, the one end portion 622 of the latch lever 620 magnetically adheres to the coupling portion 401 of the lower yoke 400b while the interference portion 621 on the other end portion of the latch lever 620 is moved to a position to interfere with the movement of locking protrusion 331. However, when the locking protrusion 331 is moved toward a parking position, as shown in FIG. 4C, the locking protrusion 331 moves toward right side hooking portion 611 and along the inclined surface 621b' of second portion 621b. Here, the latch lever 620 is slightly pushed in the direction B while the locking protrusion 331 moves over the inclined surface 621b'.

Then, the locking protrusion 331 stops after coming into contact with the right side hooking portion 611 of the stopping guard 610. Should the locking protrusion 331 spring back in the direction opposite the C direction, it is stopped by the interference portion 621 of the latch lever 620, because after the locking protrusion 331 passes second portion 621b, the latch lever 620 traps the locking protrusion 331 between right side hooking portion 611 and interference portion 621 by being rotated in the direction A by magnetic attraction between coupling portion 401 of the lower yoke 400b and one end 622 of latch lever 620. Accordingly, unless the latch lever 620 is unlocked, the locking protrusion 331 maintains a fixed state. Thus, after the magnetic head 500 is positioned on the parking area, the actuator 300 maintains a stable locking state.

The reason for supplying current to the coil 640 is to provide a driving force so that the latch lever 620 is rotated in a desired direction by providing a desired polarity thereto. Once the end 622 of the latch lever 620 magnetically adheres to the coupling portion 401 of the yoke 400b, if the supply of current is cut off, the coupling state between the magnetic bodies is maintained even against a force caused by an external impact on the hard disk housing. Thus, after locking is completed, cutting the supply of current to the coil 640 to reduce consumption of current is preferable.

Figure 5A:
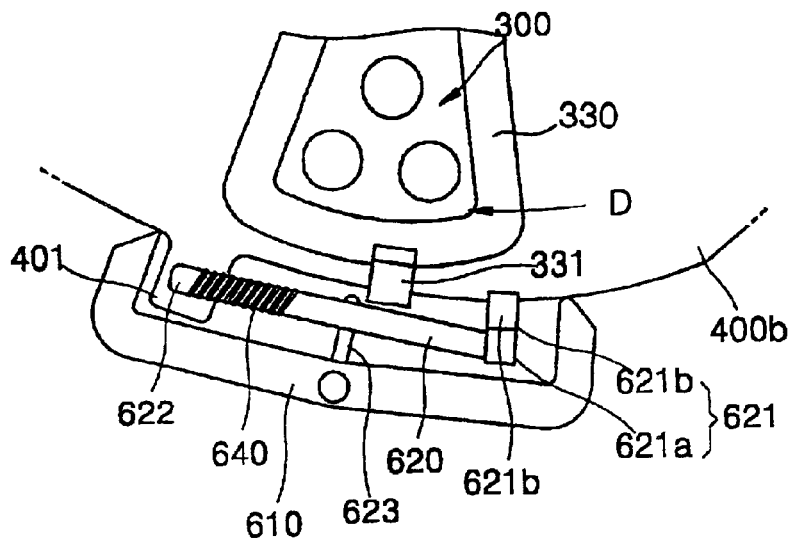
FIGS. 5A and 5B are views for explaining an unlocking step of the actuator latch device shown in FIG. 2, according to the present invention.
Figure 5B:
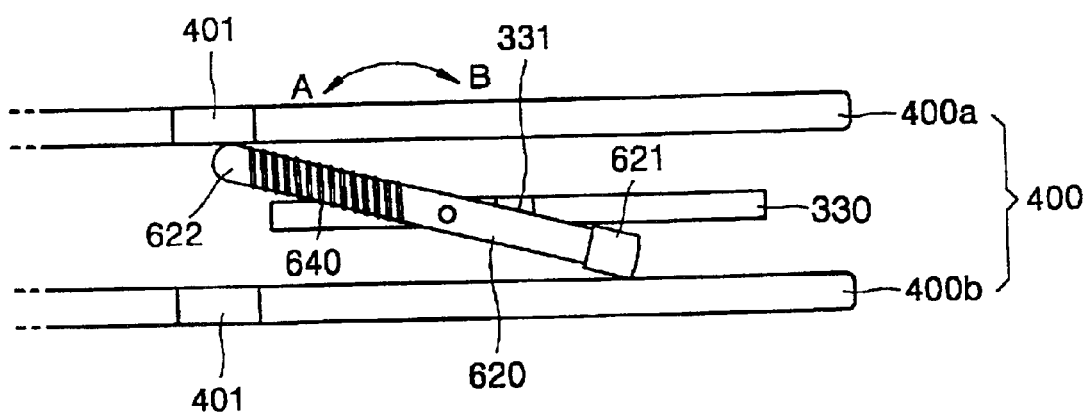

Next, in order to operate the hard disk 200 again by unlocking the actuator 300, the power supply portion 630 supplies current to the coil 640 in the direction opposite to the direction for locking. Then, polarity is formed on end 622 of the latch lever 620 to be opposite to that in the locking state. As shown in FIGS. 5A and 5B, the latch lever 620 rotates in the direction B by the interaction with the magnetic field formed between the upper and lower yokes 400a and 400b. Accordingly, the interference portion 621 is separated from the position for interfering with the locking protrusion 331 and the locking protrusion 331 becomes free within a range of restriction by the stopping guard 610. Thus, the actuator 300 which is unlocked freely pivots to move the magnetic head 500 in the recording/reproducing area 220 of the hard disk 200. After the unlocking action, the current of the coil 640 is preferably cut off to reduce consumption of current and end 622 of latch lever 620 remains magnetically adhered to coupling portion 401 of the yoke 400a.

Figure 1:
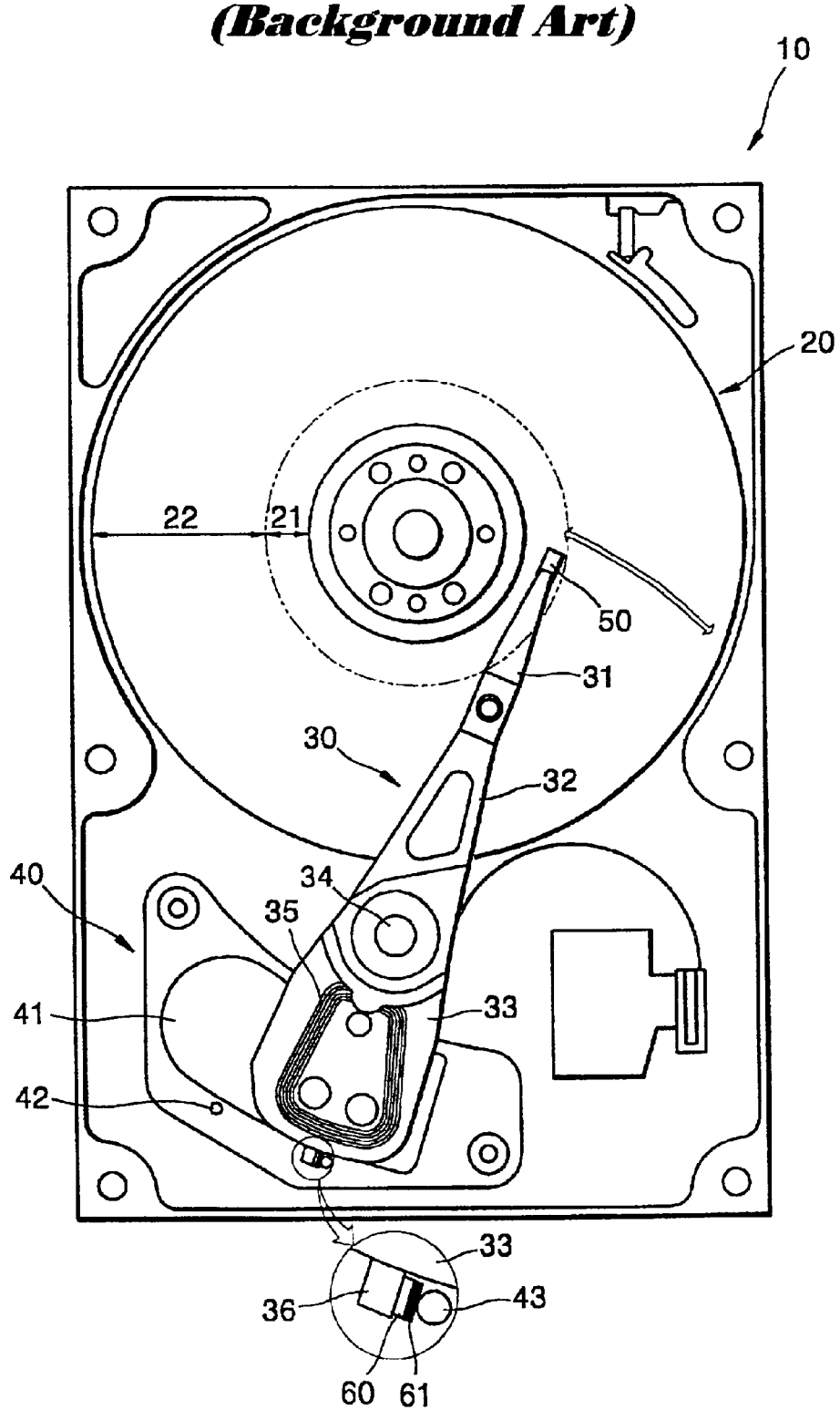
FIG. 1 is a plan view showing a hard disk drive adopting an exemplary actuator latch device.

Consequently, the actuator moves very smoothly compared to a latch device according to a conventional latch device since the locking and unlocking actions are performed as the interference portion 621 of the latch lever 620 moves to the position where the movement of the locking protrusion 331 of the actuator 300 is restricted or free. That is, referring back to FIG. 1, when a magnetic coupling between the iron piece 61 and the magnetic member 43 is removed, since the locking protrusion 36 frequently collides with the stopper 42 due to inertia generated to overcome the magnetic attraction between iron piece 61 and magnet 43, the head 500 may be damaged. In contrast, in the present invention, the latch lever 620 need only rotate in response to the magnetic attraction between the coupling portion 401 of yoke 400a and the end 622 of latch lever 620 to unlock the locking protrusion 331. That is, there is no inertia generated to overcome the magnetic attraction between coupling portion 401 of yoke 400b and the end 622 of latch lever 620. Thus, the actuator 300 can move freely so that unlocking is performed smoothly and stably. Thus, no impact is generated due to the unlocking action and a complicated structure for applying a braking force to the actuator 300 concurrently with unlocking to prevent generation of an impact, is not needed. Also, after locking, unless the latch lever 620 rotates to a position for unlocking, a firm locking state can be maintained since the actuator 300 cannot move.

As described above, in the actuator latch device of a hard disk drive according to the present invention, since locking and unlocking is performed by selectively restricting movement of the locking protrusion provided on the actuator, a locking state can be firmly maintained and unlocking is performed smoothly without any impact.

What is claimed is:

1. An actuator latch device of a hard disk drive for locking an actuator to prevent movement of the actuator, when a magnetic head installed on the actuator is parked in a parking area of a hard disk, the actuator latch device comprising:

a locking protrusion provided on an end portion of the actuator opposite an end on which said magnetic head is installed;

a stopping guard having a pair of hooking portions for restricting a pivot range of the actuator by limiting the range of horizontal movement of said locking protrusion;

a latch lever pivotally installed on said stopping guard to pivot around an axis; and a latch lever driving means for driving said latch lever, said latch lever being driven by said latch lever driving means to a locking position to prevent the actuator from rotating when said magnetic head is parked in said parking area by moving one end of the latch lever to a position for interfering with the horizontal movement of said locking protrusion.

2. The device as claimed in claim 1, wherein the latch lever driving means is provided with a coil wound around a second end of the latch lever.

3. The device as claimed in claim 1, wherein the latch lever is provided with an interference part attached to said one end of the latch lever, said interference part trapping said locking protrusion against one of said hooking portions of said stopping guard when said magnetic head is parked in said parking area.

4. The device as claimed in claim 2, wherein the latch lever is provided with an interference part attached to said one end of the latch lever, said interference part trapping said locking protrusion against one of said hooking portions of said stopping guard when said magnetic head is parked in said parking area.

5. The device as claimed in claim 3, wherein said interference part includes a stepped part having an inclined surface over which said locking protrusion slides when said magnetic head is to be parked in said parking area.

6. The device as claimed in claim 4, wherein said interference part includes a stepped part having an inclined surface over which said locking protrusion slides when said magnetic head is to be parked in said parking area.

7. The device as claimed in claim 2, wherein said actuator latch device further comprises:

an upper yoke and a corresponding first magnet positioned above a bobbin of said actuator;

a lower yoke and a corresponding second magnet positioned below said bobbin, wherein said lower yoke includes a first coupling portion for magnetically attracting said second end of the latch lever when said magnetic head is to be parked in said parking area and said upper yoke includes a second coupling portion for magnetically attracting said second end of the latch lever when said magnetic head is to be positioned over a recording/reproducing area of said hard disk.

8. The device as claimed in claim 7, wherein said latch lever driving means provides a first current to said coil when said latch lever is to be pivoted to said locking position for preventing the rotation of said actuator, and provides a second current, opposite to said first current, to said coil when said latch lever is to be pivoted to an unlocking position for enabling said actuator to be rotated.

9. The device as claimed in claim 7, wherein the latch lever driving means is provided with an interference part attached to said one end of the latch lever, said interference part trapping said locking protrusion against one of said hooking portions of said stopping guard when said magnetic head is parked in said parking area.

10. The device as claimed in claim 8, wherein the latch lever driving means is provided with an interference part attached to said one end of the latch lever, said interference part trapping said locking protrusion against one of said hooking portions of said stopping guard when said magnetic head is parked in said parking area.

11. The device as claimed in claim 9, wherein said interference part includes a stepped part having an inclined surface over which said locking protrusion slides when said magnetic head is to be parked in said parking area.

12. The device as claimed in claim 10, wherein said interference part includes a stepped part having an inclined surface over which said locking protrusion slides when said magnetic head is to be parked in said parking area.

13. An actuator latch device of a hard disk drive for locking an actuator to prevent movement of the actuator, when a magnetic head installed on the actuator is parked in a parking area of a hard disk, the actuator latch device comprising:

a locking protrusion extending from a bobbin of said actuator;

a first stop for limiting pivotal movement of the actuator in a first direction, said first stop coming into contact with said locking protrusion when said magnetic head is moved to said parking position;

an upper yoke and a corresponding first magnet positioned above said bobbin;

a lower yoke and a corresponding second magnet positioned below said bobbin, wherein said upper yoke includes a first extended coupling portion and said lower yoke includes a second extended coupling portion;

a latch lever pivotally installed adjacent to said upper and lower yokes;

an interference part attached to a first end of said latch lever;

a coil wound around a second end of said latch lever; and a power supply for driving said latch lever, wherein said second end of said latch lever is magnetically attracted to said second extended coupling portion of said lower yoke when said power supply provides a first current to said coil, and said second end of said latch lever is magnetically attracted to said first extended coupling portion of said upper yoke when said power supply provides a second current, opposite to said first current, to said coil.

14. The device as claimed in claim 13, wherein said interference part includes a stepped part having an inclined surface over which said locking protrusion slides when said magnetic head is to be parked in said parking area.

15. The device as claimed in claim 14, wherein said stepped part traps said locking protrusion against said first stop when said magnetic head is parked in said parking area and releases said locking protrusion when said actuator is enabled to position said magnetic head over a recording/reproducing area of said hard disk.

16. The device as claimed in claim 15, further comprising:

a second stop for limiting the pivotal movement of the actuator in a second direction, by limiting the movement of said locking protrusion as said actuator rotates in said second direction.

17. The device as claimed in claim 16, further comprising:

a stopping guard having a pivot shaft installed thereon, said latch lever being pivotally installed on said pivot shaft and said first and second stops are hook shaped extensions extending from opposite ends of said stopping guard.

18. An actuator latch device of a hard disk drive for locking an actuator to prevent movement of the actuator, when a magnetic head installed on the actuator is parked in a parking area of a hard disk, the actuator latch device comprising:

a locking protrusion provided on an end portion of the actuator opposite an end on which said magnetic head is installed;

a stopping guard for restricting a pivot range of the actuator by limiting the range of horizontal movement of said locking protrusion;

a rotation shaft provided on the stopping guard;

a latch lever pivotally installed on said rotation shaft; and a latch lever driving means for driving said latch lever, said latch lever being driven by said latch lever driving means to a locking position to engage one end of said latch lever with said locking protrusion to prevent the actuator from rotating when said magnetic head is parked in said parking area.

19. The device as claimed in claim 18, wherein the latch lever driving means is provided with a coil wound around another end of the latch lever.

20. An actuator latch device of a hard disk drive for locking an actuator to prevent movement of the actuator, when a magnetic head installed on the actuator is parked in a parking area of a hard disk, the actuator latch device comprising:

a locking protrusion extending rearwardly from an end portion of the actuator opposite an end on which said magnetic head is installed;

a stopping guard for restricting a pivot range of the actuator by limiting the range of horizontal movement of said locking protrusion in two directions;

a rotation shaft installed on the stopping guard and extending toward said actuator;

a latch lever pivotally installed on said rotation shaft between said actuator and said stopping guard; and a latch lever driving means for driving said latch lever, said latch lever being driven by said latch lever driving means to a locking position to engage a first end of said latch lever with said locking protrusion to trap said locking protrusion between said stopping guard and said first end of said latch lever.

21. The device as claimed in claim 20, wherein the latch lever driving means comprises:

coil wound around a second end of the latch lever;

a lower yoke including a first coupling portion for magnetically attracting said second end of the latch lever when said magnetic head is to be parked in said parking area;

an upper yoke including a second coupling portion for magnetically attracting said second end of the latch lever when said magnetic head is to be positioned over a recording/reproducing area of said hard disk;

a power supply providing a first current to said coil when said latch lever is to be pivoted to said locking position for preventing the rotation of said actuator, and providing a second current, opposite to said first current, to said coil when said latch lever is to be pivoted to an unlocking position for enabling said actuator to be rotated.

* * * * *